United States Patent [19]

Uno

[11] Patent Number: 4,532,552
[45] Date of Patent: Jul. 30, 1985

[54] LASER ACTIVATING SYSTEM FOR LASER PRINTING

[75] Inventor: Masaki Uno, Nara, Japan

[73] Assignee: Sharp Kabushiki Kaisha, Osaka, Japan

[21] Appl. No.: 458,582

[22] Filed: Jan. 17, 1983

[30] Foreign Application Priority Data

Jan. 20, 1982 [JP] Japan .................................. 57-7822

[51] Int. Cl.³ .............................................. H04N 1/24
[52] U.S. Cl. .................................... 358/302; 358/280
[58] Field of Search ................ 358/293, 300, 302, 280

[56] References Cited

U.S. PATENT DOCUMENTS

| 3,800,080 | 3/1974 | Fuwa | 358/280 |
|---|---|---|---|
| 4,034,408 | 7/1977 | Starkweather | 358/293 |
| 4,268,867 | 5/1981 | Traino | 358/293 |
| 4,435,733 | 3/1984 | Tagawa | 358/293 |

Primary Examiner—Howard W. Britton
Attorney, Agent, or Firm—Birch, Stewart, Kolsch & Birch

[57] ABSTRACT

An apparatus for recording the information content of an electrical signal on the surface of a light sensitive medium by means of a plurality of scan traces across said medium comprises a source for providing a light beam of high intensity modulated in accordance with electrical information supplied thereto, an actuator for actuating the source means and generating sync signals, the frequency of the sync signals being altered in accordance with variations in scanning speeds of the light beam to impinge on the medium, a reflector having a plurality of contiguous reflective faces rotatable about a central axis, a rotation device for rotating said reflector about said central axis; and a lens, disposed between said source and said reflector, for receiving and passing through said light beam.

8 Claims, 11 Drawing Figures

Rotation Sync Signal

F1 Gate
F1 Oscillator
F2 Gate
F2 Oscillator

N1

Oscillation ON/OFF

TTL

F1 Gate

Threshold Voltage about 500n sec

TTL Output

LASER ACTIVATING SYSTEM FOR LASER PRINTING

BACKGROUND OF THE INVENTION

The present invention relates to a flying spot scanning system for communicating video information to a scanned medium, and more particularly to a system for activating a laser for a scanning system comprising a rotating polyhedron mirror for controlling a scanning laser beam.

Recently, improved recording devices, the so-called "laser printers" have been gaining popularity and have been meeting with commercial success. The major performance of "laser printers" is that visual data such as letters and pictures etc. derived from a computer, a word processor, and a facsimile device etc. are imparted to a scanned medium in the form of an electrostatic charge pattern. A laser beam functions as scanning light.

An example of the "laser printers" is disclosed in Starkweather, U.S. Pat. No. 4,034,408 issued July 5, 1977, entitled "Flying Spot Scanner".

The conventional laser printer requires a collimator lens, a beam expander lens and an f-$\theta$ characteristics imaging lens, (f: focal length $\theta$: inclination angle) which are very costly thereby making the laser printer expensive and impractical.

Conventionally, the f-$\theta$ characteristics imaging lens is required to compensate for distortion aberration which is due to speedy beam scanning at the ends of the scanned medium. The f-$\theta$ characteristics imaging lens provides strong barrel aberration. With the help of the f-$\theta$ characteristics imaging lens, the laser beam scans on the scanned medium at a constant speed.

Thus, it is desired to develop laser printers at a practical cost. U.S. patent application Ser. No. 352,151 was filed by T. Tagawa et al on Feb. 25, 1982, entitled "FLYING SPOT SCANNER FOR LASER PRINTER", now U.S. Pat. No. 4,435,733, to propose a laser printer free of the f-$\theta$ characteristics imaging lens. This application is now U.S. Pat. No. 4,435,733, issued Mar. 6, 1984.

The laser printer of the present invention can be combined with the laser printer as disclosed in U.S. Pat. No. 4,435,733. The disclosure of that patent is further incorporated herein by reference.

SUMMARY OF THE INVENTION

Accordingly, it is an object of the present invention to provide an improved laser printer.

It is another object of the present invention to provide an improved system for activating a laser for a flying spot scanning system suitable for a laser printer.

It is a further object of the present invention to provide an improved system for activating a laser with a combined sync signal so that a laser beam scans on a medium at a varying speeds.

Briefly described, in accordance with the present invention, an apparatus for recording the information content of an electrical signal on the surface of a light sensitive medium by means of a plurality of scan traces across said medium comprises source means for providing a light beam of high intensity modulated in accordance with electrical information supplied thereto, actuate means for actuating the source means and generating sync signals, the periods of the sync signals being altered in accordance with variations in scanning speeds of the light beam to impinge on the medium, reflector means having a plurality of contiguous reflective faces rotatable about a central axis, rotation means for rotating said reflector means about said central axis, and lens means, disposed between said source means and said reflector means, for receiving and passing through said light beam.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
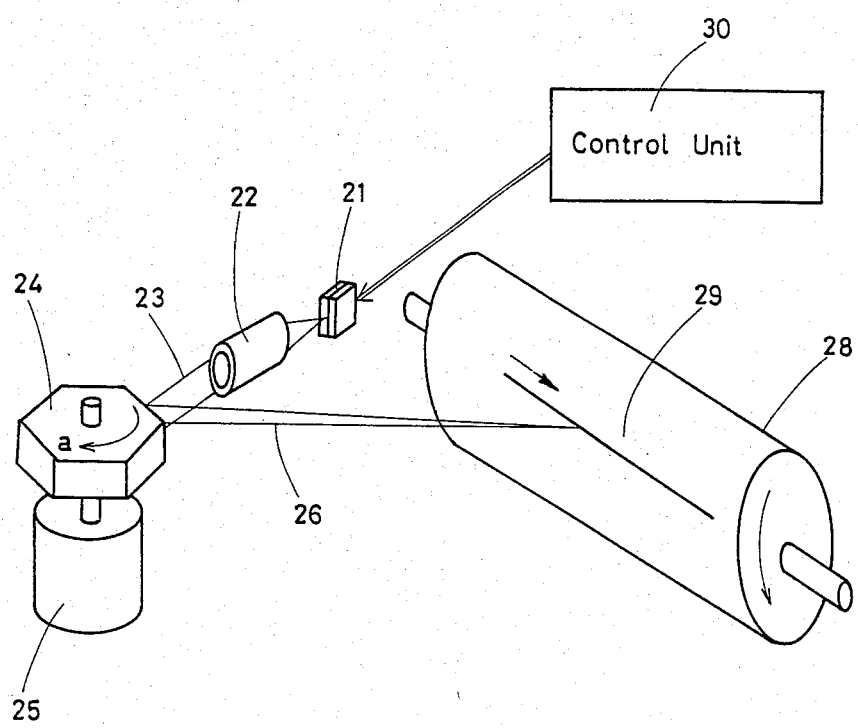
FIG. 1 shows a flying spot scanning system for a laser printer according to the present invention.

With reference to FIG. 1, a flying spot scanning system of the present invention comprises a semiconductor laser diode 21, a focus (convergence) lens 22, a polyhedron mirror 24, a motor 25, a scanned medium 28, and a control unit 30.

The laser diode 21 can be replaced in the present invention by a gas laser such as a He-Ne laser accompanied with an acousto-optical modulator for modulating a laser beam in conformance with video signal information.

A preferred embodiment of the present invention is described below in terms of the semiconductor laser diode.

The scanned medium 28 may be a xerographic drum which rotates consecutively through a charging station depicted by a corona discharge device. The laser beam from the rotating polyhedron mirror 24 traverses a scan width on the drum 28. Usable images are provided in that the information content of the scanning spot is represented by the modulated or variant intensity of laser beam respective to its position within the scan width. The scanned spot dissipates the electrostatic charge in accordance with its laser intensity.

When the laser diode 21 is turned on and off by the control unit 30 to modulate the laser beam according to the video signal information to be recorded, the presence and absence of the laser beam on the scanned spot forms a pattern in conformance with the video signal information.

The electrostatic charge pattern thus produced is developed in a developing station and then transferred to the final copy paper. In this manner, the information content of the scanned spot is recorded on a more permanent and useful medium. Of course, alternative prior art techniques may be employed to cooperate with a scanned spot in order to utilize the information contained therein.

The polyhedron mirror 24 is continuously driven by the motor 25 and synchronized in rotation to a synchronization signal representative of the scan rate used to obtain the original video signal. The rotation rate of the xerographic drum 28 determines the spacing of the scan lines. It also may be preferable to synchronize the drum 28 in some manner to the signal source to maintain image linearity. The source image is reproduced in accordance with the signal and is transferred to printout paper for use or storage.

Thus, the flying spot scanning system can be adapted for the so-called laser printer.

The semiconductor laser diode 21 may be selected to be a laser diode having a circular laser emission portion within about 2-3 μm. Such a laser diode can be a double heterojunction GaAs-GaAlAs diode (DH type) having an emission portion of about 3 μm or a buried heterojunction diode (BH type).

The beam emitted from the laser diode 21 focuses with the focus lens 22 to form an impinging light beam 23. The beam 23 is reflected by the polyhedron mirror 24 rapidly driven by the motor 25 in a direction denoted as a around a central axis. A reflected beam 26 is applied to the scanned medium 28 to form a scanning line 29.

The focus lens 22 comprises a combination of a pair of concave-convex lenses in axial symmetry, preferably, spherical lenses. The laser emission surface of the laser diode 21 is placed outside a focus of the focus lens 22 and the emission point of the laser 21 focuses on the scanning medium.

It may be possible that a cylindrical lens having a cross section of no curve in its longitudinal side is disposed between the polyhedron mirror 24 and the scanned medium 28.

When the cylindrical lens is disposed, the laser beam orthogonal to the junction surface of the laser diode 21 is incident upon the longitudinal side of the cylindrical lens. The cylindrical lens comprises a plano-convex lens. The flat surface of the cylindrical lens faces the scattered medium 28. The cylindrical lens is preferably separated from the medium 28 by a distance of about 15 mm, similar to the focus length of the cylindrical lens, also preferably about 15 mm.

The laser diode 21 emits the laser beam having a cross section of an ellipse where the longitudinal axis extends in a direction parallel to the junction surface of the diode. When such a laser beam passes through the axially symmetrical focus lens 22, the focused spot also forms an ellipse.

Figure 2:
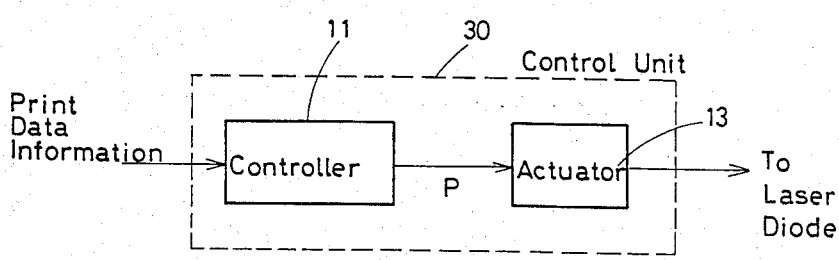
FIG. 2 shows a block diagram of a control unit for activating a laser according to the present invention.

FIG. 2 shows a block diagram of the control unit 30 for activating the laser diode 21. The control unit 30 comprises a controller 11 and an actuator 13. The controller 11 receives print data information developed from a computer, a word processor, and a facsimile device etc. The controller 11 develops laser actuating signals P representative of the print data information. The actuator 13 is responsive to the laser actuating signals P developed from the controller 11 for causing the laser diode 21 to be turned on and off.

Figure 3:
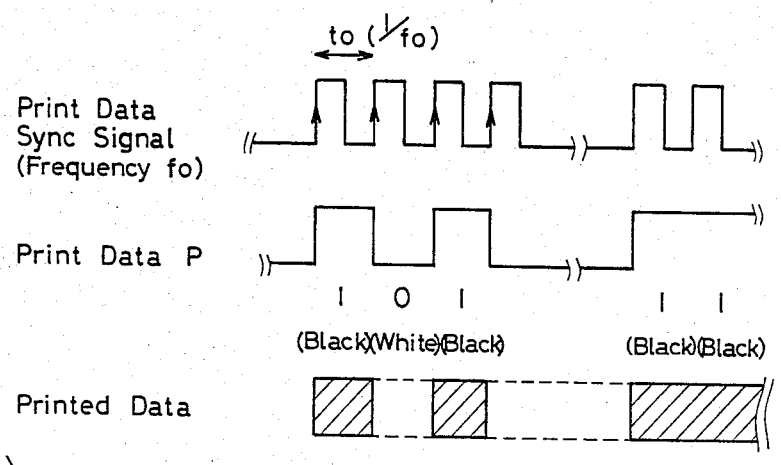
FIG. 3 shows a conventional relation between print data sync signals, print data and printed data in accordance with a print principle for a conventional laser printer devoid of any print-width correction element.

FIG. 3 shows a conventional relationship between print data sync signals, print data, and printed data in accordance with a print principle for a conventional laser printer devoid of any print-width correction element.

Conventionally, sync signals have a constant period ($1/f_o$). A laser diode emits and stops a laser beam in synchronization with a rising of one cycle of the sync signals. One cycle of sync signals enable the laser beam to write one print dot, so that a desirable pattern can be printed in conformance with print data.

As FIG. 3 shows, the sync signals are assumed to have a frequency $1/f_o$ and a constant period $f_o$. A print width on a scanned medium on which the laser beam reflected by a polyhedron mirror can impinge is represented by the product of a velocity V, at which the laser beam scans on the medium surface by rotating the polyhedron mirror, and a time when the laser beam is emitted by the laser diode. When one cycle of the sync signals enable the laser beam to write one print dot as shown in FIG. 3, the width of one print dot is different between the center and the ends of the scanned medium. Since the velocity V at the scanned medium ends is more rapid than at the center, the dot width at the ends is longer than that at the center.

According to the present invention, the frequency of the sync signals are varied in conformance with the variations in the velocity of the laser beam impinging on the scanned medium to correct the print dot width variations.

Figure 4:
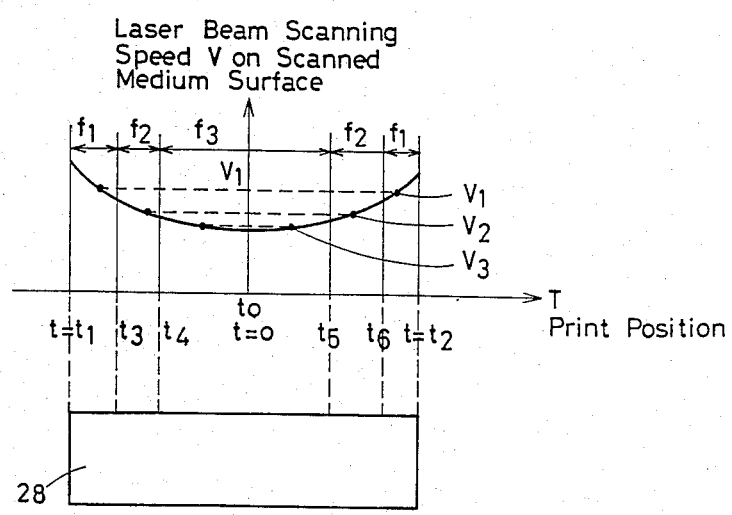
FIG. 4 shows a relation between laser beam scanning speed and print positions on a scanned medium according to the present invention.

FIG. 4 shows a relation between laser beam scanning speed V and print positions T on the scanned medium 28 according to the present invention. In FIG. 4, $t_1$ indicates a print starting time on the medium 28 and $t_2$ indicates a print termination time. The laser beam can impinge in the period $t_1$-$t_2$ on the medium 28. The speed V is one of the laser beam impinging on a position of the medium 28. The velocity graph shows a symmetrical relation around the center $t_0(t=0)$.

The speed V at $t_1$-$t_3$ and $t_2$-$t_6$ is faster than the speed at $t_0$-$t_4$ and $t_0$-$t_5$. That is, the following inequality stands:

$$v_1 > v_2 > v_3$$

where
 $v_1$: the velocity at $t_1$-$t_3$ and $t_2$-$t_6$
 $v_2$: the velocity at $t_3$-$t_4$ and $t_5$-$t_6$
 $v_3$: the velocity at $t_0$-$t_4$ and $t_0$-$t_5$ According to the present invention, when the laser beam scans on the ends of the medium 28, the period of the sync signals is made narrower to correct print dot width variations.

Figure 5:
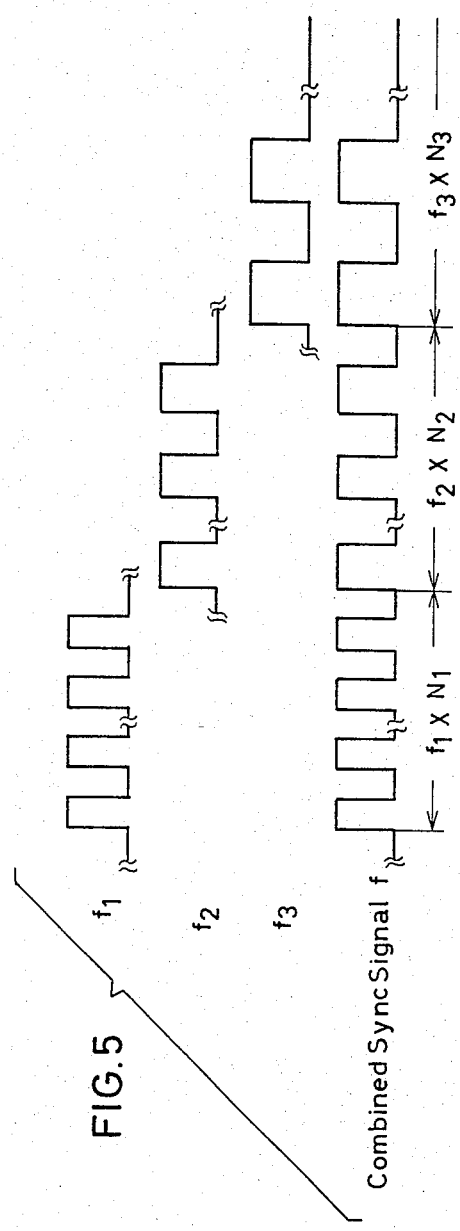
FIG. 5 shows a time chart of combined sync signals according to the present invention.

FIG. 5 shows a time chart of combined sync signals according to the present invention. The periods of the sync signals are selected to be as follows:

A first sync signal of a frequency $f_1$ having the shortest period is used for the velocity $v_1$. A second sync signal of a frequency $f_2$ having a medium period is used for the velocity $v_2$. A third sync signal of a frequency $f_3$ having the longest period is used for the velocity $v_3$.

Since the values of the velocities $v_1$, $v_2$ and $v_3$ are not constant within the respective position intervals, it may be necessary to calculate a mean value or a medium between a maximum and a minimum. When the laser beam velocity is selected to be the mean value or the medium, an approximately correct amendment can be attained.

To keep the width of one print dot constant over all the scanned positions of the medium 28, the frequencies of the three sync signals must satisfy the following equation.

$$\frac{v_1}{f_1} = \frac{v_2}{f_2} = \frac{v_3}{f_3} = K \text{ (constant)}$$

In FIG. 5, $N_1$, $N_2$ and $N_3$ represent the number of cycles of the sync signals used for the respective print intervals, namely, the number of the print dots.

Sync signals having the three different periods are combined by the controller 11. The combined sync signals are developed from the actuator 13 toward the laser diode 21. The width of one print dot is constant between the center and the ends of the medium 28. At the ends, the laser beam scans faster, but a laser emission time is made shorter with the help of the shortest frequency $f_1$, thereby compressing the width of one print dot.

Figure 6:
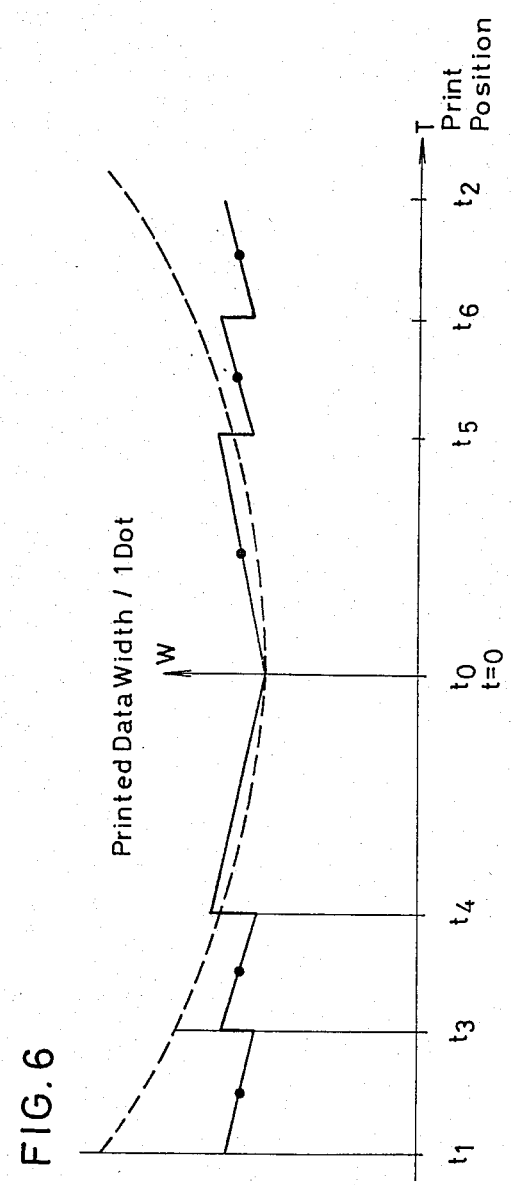
FIG. 6 shows a relation between printed data widths per 1 dot and the print positions on the scanned medium.

FIG. 6 shows a relation between print data widths per 1 dot and the print positions at $t_1$-$t_2$ on the scanned medium 28. In FIG. 6, a solid line shows a case using the signals as shown in FIG. 5 and a dotted line shows a conventional case as shown in FIG. 3.

The graph of FIG. 6 indicates that the linearity of the print dot widths is improved by the present invention, to provide well-qualified visibility.

Ripples in the print dot width in FIG. 6 can be neglected in practice.

The number of the sync signals having the different frequencies to be combined can be freely selected within the knowledge of the present invention.

Figure 7:
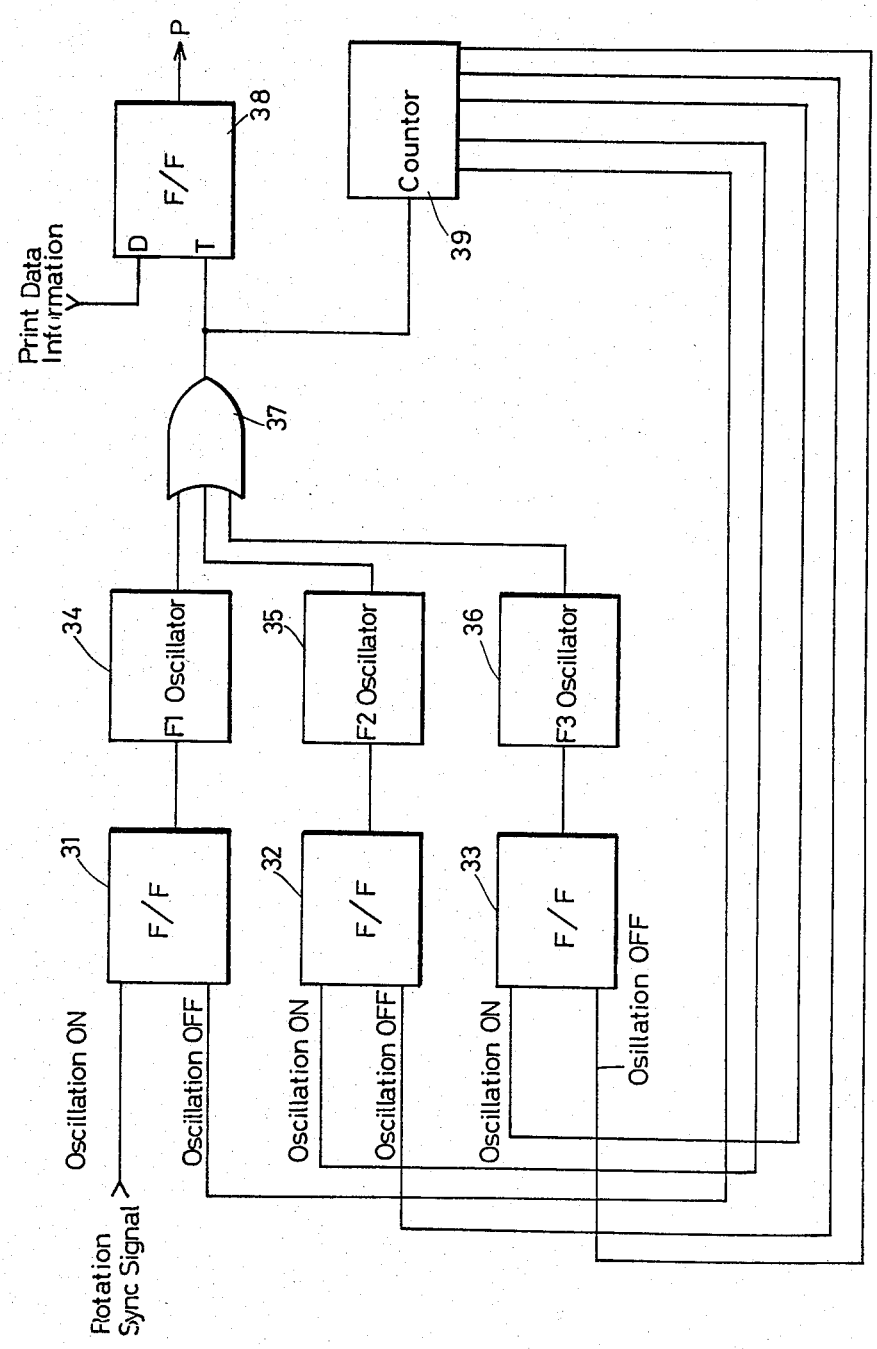
FIG. 7 shows a block diagram of a controller provided width the control unit of FIG. 2.

FIG. 7 shows a block diagram of the controller 11 as shown in FIG. 2. The controller 11 comprises three flip-flops 31 to 33, an $f_1$ oscillator 34, an $f_2$ oscillator 35, an $f_3$ oscillator 36, an OR gate 37, a D/T flip-flop 38, and a counter 39.

Figure 8:
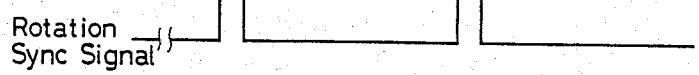
FIG. 8 shows a time chart of a rotation sync signal used for the controller FIG. 7.

A rotation sync signal is generated in synchronization with the rotation of the motor 25 in a sequence of a single pulse for each single-line scanning, as shown in FIG. 8. The rotation sync signal is applied to a flip-flop 31 connected to the $f_1$ oscillator 34. The rotation sync signal acts as an oscillation ON signal. An oscillation OFF signal is entered to the flip-flop 31 from the counter 39. The counter 39 controls counting the number of cycles. The counter 39 provides oscillation ON/OFF signals to be applied to the flip-flops 32 and 33.

The flip-flop 31 is turned on in response to the rotation sync signal, so that the $f_1$ oscillator 34 oscillates to generate clocks. The $f_2$ and $f_3$ oscillators 35 and 36 are prevented from oscillating. The clocks generated by the $f_1$ oscillator 34 are entered to the counter 39 through the OR gate 37, so that the counter 39 counts the number of the clocks.

Figure 9:
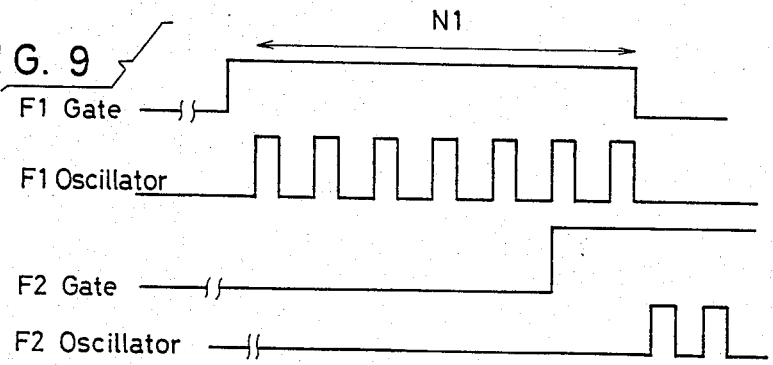
FIG. 9 shows a time chart of signals occurring within oscillators provided within the controller of FIG. 7.

When the counter 39 counts the number of the clocks up to $N_1$, the counter 39 causes the $f_1$ oscillator 34 to be inoperative and, simultaneously, the $f_2$ oscillator 35 to be operative. Then, the $f_2$ oscillator 35 oscillates to generate clocks as shown in FIG. 9. In this manner, the $f_1$ to $f_3$ oscillators 34 to 36 oscillate to generate the combined sync signal as shown in FIG. 5.

The D/T flip-flop 38 receives the clocks generated by the flip-flops 34 to 36 at a T input terminal. The flip-flop 38 receives the print data information at a D input terminal. The flip-flop 38 generates the laser actuating signals P.

Figure 10:
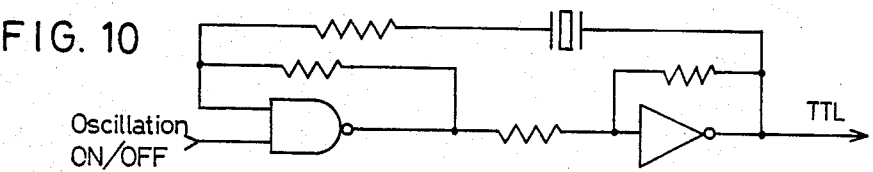
FIG. 10 shows a block diagram of a gate signal generator in one of the oscillators provided within the controller of FIG. 7.

FIG. 10 shows a block diagram of a gate signal generator, in one of the oscillators 34 to 36, for generating a gate signal for the oscillator. The oscillator itself is permitted to oscillate and prevented from oscillating.

Figure 11:
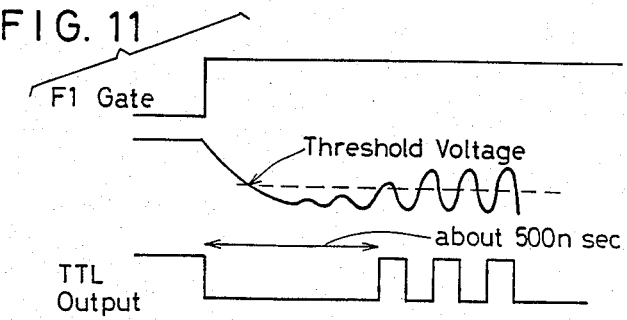
FIG. 11 shows a time chart of signals occurring within the data signal generator of FIG. 10.

FIG. 11 shows a time chart of signals occurring within the gate signal generator of FIG. 10.

The oscillator oscillates when it delays a moment, for example, about 500 nsec as compared to an oscillation start signal. Therefore, it may be necessary to make the $f_2$ oscillator 35 operative prior to the stop of the $f_1$ oscillator 34 by this moment in order to continue to generate the clocks.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An apparatus for recording the information content of an electrical signal on the surface of a light sensitive medium as a plurality of print dots of substantially constant print dot widths by means of a plurality of scan traces across said medium comprising:
    source means for providing a light beam of high intensity modulated in accordance with electrical information supplied thereto, said light beam generating said scan traces across said medium;
    actuate means for actuating the source means and generating sync signals, said sync signals controlling the print dot widths generated by said light beam, said actuate means being responsive to variations in scanning speeds of the light beam impinging on the medium to alter the periods of said sync signals and the associated print dot widths;
    reflector means having a plurality of contiguous reflective faces rotatable about a central axis;
    rotation means for rotating said reflector means about said central axis; and
    lens means, disposed between said source means and said reflector means, for receiving and passing through said light beam.

2. The apparatus of claim 1, wherein said lens means comprises a focus lens of an axially symmetrical lens.

3. The apparatus of claim 1, wherein the periods of the sync signals and the associated print dot widths are made shorter as the light beam scans on a first part of the medium faster than on a second part of the medium.

4. The apparatus of claim 1, wherein the periods of the sync signals are selected to satisfy the following equation;

$$\frac{v_1}{f_1} = \frac{v_2}{f_2} = K \text{ (constant)}$$

where
  $v_1$: a first velocity of the light beam impinging on the medium
  $v_2$: a second velocity of the light beam impinging on the medium $f_1$: a first frequency of the sync signals
$f_2$: a second frequency of the sync signals 5. The apparatus of claim 1, further comprising second lens means disposed between said reflector means and said light sensitive medium, for receiving said light beam.

6. The apparatus of claim 5, wherein said second lens means comprises a cylindrical lens.

7. The apparatus of claim 6, wherein said cylindrical lens is of a convex shape on both sides or a plano-convex shape.

8. The apparatus of claim 7, wherein a flat side of said plano-convex lens as the cylindrical lens faces the surface of said light sensitive medium and a convex side of said plano-convex lens faces said reflector medium.

* * * * *